United States Patent
Fleury-Frenette et al.

(10) Patent No.: US 8,242,446 B2
(45) Date of Patent: Aug. 14, 2012

(54) THERMAL DETECTOR

(75) Inventors: Karl Fleury-Frenette, Seraing (BE);
Serge Habraken, Comblain-au-Pont (BE); Yvon Renotte, Embourg (BE); Jurij Hastanin, Seraing (BE)

(73) Assignee: Université de Liège, Angleur (BE)

( * ) Notice: Subject to any disclaimer, the term of this patent is extended or adjusted under 35 U.S.C. 154(b) by 812 days.

(21) Appl. No.: 12/227,695

(22) PCT Filed: May 24, 2007

(86) PCT No.: PCT/EP2007/055068
§ 371 (c)(1),
(2), (4) Date: Nov. 25, 2008

(87) PCT Pub. No.: WO2007/137995
PCT Pub. Date: Dec. 6, 2007

(65) Prior Publication Data
US 2009/0238236 A1    Sep. 24, 2009

(30) Foreign Application Priority Data
Jun. 1, 2006 (EP) .................................. 06011321

(51) Int. Cl.
*G01J 1/00* (2006.01)
*G01J 5/00* (2006.01)
(52) U.S. Cl. .................. 250/336.1; 250/338.1
(58) Field of Classification Search ............... 250/336.1, 250/338.1
See application file for complete search history.

(56) References Cited

U.S. PATENT DOCUMENTS

| | | | |
|---|---|---|---|
| 5,465,611 A * | 11/1995 | Ruf et al. | 73/104 |
| 5,929,440 A | 7/1999 | Fisher | |
| 6,388,256 B1 | 5/2002 | Watton et al. | |
| 6,805,839 B2 * | 10/2004 | Cunningham et al. | 422/82.12 |

FOREIGN PATENT DOCUMENTS

| | | |
|---|---|---|
| WO | WO 99/61897 | 12/1999 |
| WO | WO 2005/090973 | 9/2005 |

OTHER PUBLICATIONS

Chadwick et al. "An Optical Temperature Sensor Using Surface Plasmons." Japanese Journal of Applied Physics, vol. 32, Part 1, No. 6A, Jun. 1993, pp. 2716-2717.

(Continued)

*Primary Examiner* — David Porta
*Assistant Examiner* — Mindy Vu
(74) *Attorney, Agent, or Firm* — Jacobson Holman PLLC

(57) ABSTRACT

A first object of the invention is a radiation detector comprising an energy absorber (203), for absorbing incident radiation (RAD) and thus undergoing a temperature increase; and optical readout means, for detecting said temperature increase; wherein said optical readout means comprises input coupling means (202) for coupling a light beam (2011) to said energy absorber (203) by exciting surface plasmons resonance, a surface plasmons resonance condition being dependent on the energy absorber (203) temperature, and wherein said energy absorber (203) is separated from said input coupling means (202) by a dielectric layer (2032).

Figure 1A:
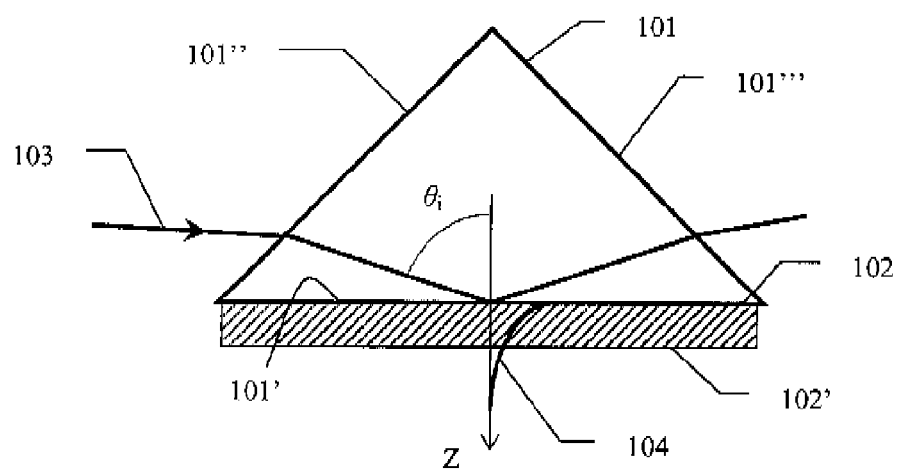

A second object of the invention is a micromechanical sensor comprising: a micromechanical oscillator and optical readout means (202) for detecting a displacement of said micromechanical oscillator; wherein said optical readout means comprise input coupling means (202) for coupling a light beam (2011) to a conductive surface (2031) by exciting surface plasmons resonance, a surface plasmons resonance condition being dependent on the displacement of said micromechanical oscillator.

23 Claims, 5 Drawing Sheets

OTHER PUBLICATIONS

Chiang et al. "Surface Plasmon Resonance Monitoring of Temperature via Phase Movement." Optics Communications, vol. 241, No. 4-6, Nov. 16, 2004, pp. 409-418.

Konopsky et al. "Operation of Scanning Plasmon Near-Field Microscope with Gold and Silver Tips in Tapping Mode: Demostration of Sub-tip Resolution." Optics Communications, vol. 185, No. 1-3, Nov. 1, 2000, pp. 89-93.

Marquette et al. "State of the Art and Recent Advances in Immunoanalytical Systems." Biosensors & Bioelectronics, vol. 21, No. 8, Feb. 15, 2006, pp. 1424-1433.

Ozdemir et al. Temperature Effects on Surface Plasmon Resonance: Design Considerations for an Optical Temperature Sensor. Journal of Lightwave Technology, vol. 21, No. 3, Mar. 3, 2003, pp. 805-808.

Xinglong et al. "A Surface Plasmon Resonance Imaging Interferometry for Protein Micro-Array Detection." Sensors and Actuators B, vol. 108, No. 1-2, Jul. 22, 2005, pp. 765-771.

Beaulieu. "Calibrating Laser Beam Deflection Systems for Use in Atomic Force Microscopes and Cantilever Sensors." Applied Physics Letters, vol. 88, 2006.

Beaulieu et al. "A Complete Analysis of the Laser Beam Deflection Systems Used in Cantilever-Based Systems." Ultramicroscopy, vol. 107, 2007, pp. 422-430.

Gfeller et al. "Micromechanical Oscillators as Rapid Biosensor for the Detection of Active Growth of *Escherichia coli*." Biosensors & Bioelectronics, vol. 21, 2005, pp. 528-533.

Lang et al. "An Artificial Nose Based on Microcantilever Arry Sensors." Journal of Physics: Conference Series 61, 2007, pp. 663-667.

Lang et al. "An Artificial Nose Based on a Micromechanicla Cantilever Array." Analytica Chimica Acta, vol. 393, 1999, pp. 59-65.

Lee et al. "Near-field Imaging of High-Frequency Magnetic Fields with Calorimetric Cantilever Probes." Journal of Applied Physics, vol. 99, 2006.

Mitko et al. "Fast Therom-reflectance Bolometry." Proceedings Symposium IEEE/LEOS Benelux Chapter, 2003, pp. 177-180.

Loh et al. "Sub-10 $cm^3$ Interferometric Accelerometer with Nano-g Resolution." Journal of Microelectrochemical Systems, vol. 11, No. 3, Jun. 2002, pp. 182-187.

Quist et al. "Nanomechanical Cantilever Motion Generated by a Surface-Confined Redox Reaction." J. Physics Chem. B, vol. 107, 2003, pp. 10691-10695.

Ruskell et al. "Field Mapping with the Magnetic Resonance Force Microscope." Journal of Applied Physics, vol. 86, No. 1, Jul. 1999, pp. 664-670.

Tabard-Cossa et al. "Redox-Induced Surface Stress of Polypyrrole-Based Actuators." J. Phys. Chem. B, vol. 109, 2005, pp. 17531-17537.

Tabard-Cossa et al. "A Differential Microcantilever-based System for Measuring Surface Stress Changes Innduced by Electrochemical Reactions." Sensors and Actuators B, vol. 107, 2005 pp. 233-241.

Tissor et al. "320×240 Microbolometer Uncooled IRFPA Development." Infrared Technology and Applications XXVI, Proceedings of SPIE vol. 4130, 2000, pp. 473-479.

Payne et al. "Low Cost Digital Vibration Meter." Journal of Research of the National Institute of Standards and Technology, vol. 112, No. 2, Mar.-Apr. 2007, pp. 473-479.

Vidic et al. "A New Cantilever System for Gas and Liquid Sensing." Ultramicroscopy, vol. 97, 2003, pp. 407-416.

Zhao et al . "Optomechanical Uncooled Infrared Imaging System: Design, Microfabrication, and Performance." Journal of Microelectromechanical Systems, vol. 11, No. 2, Apr. 2002, pp. 136-146.

Baller et al "A Cantilever Array-Based Artificial Nose." Ultramicroscopy, vol. 82, 2000, pp. 1-9.

Kittel "Introduction to Solid State Physics." $3^{rd}$ Edition, John Wiley and Sons, New York 1996, Chapter 8. pp. 271-304.

Raether "Surface Plasmons on Smooth and Rough Surfaces and on Gratings," Springer tracts in Modern Physics, vol. 111, Springer-Verlang Berling Heidelberg, New York, 1988, pp. 5-40.

Otto "The Surface Polarition Resonance in Attenuated Total Reflection." Polaritions, Pergamon Press, New York, 1974, pp. 117-121.

Goodman Introduction to Fourier Optics.: McGraw-Hill, 1968, Ch. 7-1, pp. 143-149.

International Search Report dated Nov. 22, 2007.

* cited by examiner

THERMAL DETECTOR

This is a national stage of PCT/EP2007/055068 filed May 24, 2007 and published in English, which has a priority of European No. 06011321.4 filed Jun. 1, 2006, hereby incorporated by reference.

The invention relates to a sensor based on surface plasmon resonance. According to different embodiments of the invention, such a sensor can detect a variety of environmental conditions, such as radiation (electromagnetic radiation or particles), electromagnetic fields, temperature, acceleration, or the presence and concentration of chemical substances and/or biological organisms or parts thereof.

A first, important application of the invention is the thermal detection of electromagnetic radiation (e.g. infrared, x-rays) and/or particles.

Radiation and/or particle detectors can be divided into two main families, quantum detectors and thermal detectors. A significant advantage of thermal detectors over quantum ones is that they can work in a very large spectral band; another advantage is that they can often be operated at room temperature, without cryogenic cooling, even in the thermal infrared spectral domain (wavelength greater than or equal to 3-5 µm).

Thermal detectors typically comprise an energy absorber, which absorbs incident radiation or particles to be detected and undergoes a temperature increase as a consequence of said absorption, and readout means, detecting said temperature increase. The sensitivity of such a device critically depends on the thermal isolation of the energy absorber and on its thermal capacity: it will be easily understood that maximum sensitivity will be obtained by using a highly-isolated energy absorber having a low thermal capacity, so that even a small amount of absorbed energy induces a significant temperature increase.

A common type of thermal radiation detector is the uncooled micro-bolometer, often manufactured in the form of two-dimensional arrays of individual pixels for imaging application. A micro-bolometer comprises a thin film absorbing detector and a thermal isolation structure, called "microbridge structure", for increased detection sensitivity; incident radiation absorbed by the device induces a temperature increase that further result in variations of the electric conductivity of the thin film. Micro-bolometers are described, for example, in U.S. Pat. No. 6,388,256 and in the paper by J. L. Tissot et al, "320×240 microbolometer uncooled IRFPA development", SPIE Vol. 4130, Infrared technology and Applications XXVI pp. 473-479, 2000.

The principal limitation of the detectors of the micro-bolometer type comes from the electrical connections required to read the temperature variations induced by incident radiation. The complexity of manufacturing pixel interconnections and the readout circuit has maintained the cost prohibitive for many applications. Moreover, these electrical interconnections impair the thermal isolation between the pixels and the readout system and, as a result, limit the thermal sensitivity of the detector.

In order to get rid of the thermal link provided by the electrical connections, thermal detectors having optical readout means have been developed. In these devices, optical techniques are used to monitor temperature variations induced by the absorption of an incident radiation. For example, U.S. Pat. No. 5,929,440 describes a micro-optomechanical infrared thermal detector comprising a bi-material micro-cantilever beam consisting of a visible reflector and an infrared absorber; a visible light beam is directed to the visible reflector part of the micro-cantilever beam, while the infrared absorber part is exposed to the radiation to be detected. Infrared radiation absorbed by the infrared absorber, produces heat that increases the temperature and induces a deflection of the bi-material micro-cantilever beam which is proportional to the temperature change and to the difference in thermal expansion coefficient of the two materials composing it. In turn, the deflection of the micro-cantilever beam induces a corresponding deviation of the reflected visible light beam, which is detected by an optical detector.

A similar device is described in the paper by Yang Zhao et al. "Optomechanical Uncooled Infrared Imaging System: Design, Microfabrication, and Performance", Journal of Microelectromechanical Systems, vol. 11, no. 2, 04/2002. In this detector, however, optical readout is performed by examining the diffraction pattern of a visible light beam by a bi-dimensional array of micro-cantilever beams.

Micro-cantilever beam deflection can also be measured by interferometric means, e.g. by using the reflecting part of said micro-cantilever beam as a movable mirror in a Fizeau interferometer.

The performances of prior art thermal detectors with optical readout means based on the micro-cantilever beam principle are limited by a tradeoff between thermal sensitivity on one side, which requires a long cantilever beam in order to amplify the deflection effect, and spatial resolution, response time and sensitivity to vibration noise on the other, which would suggest using cantilever beams as short as possible. As a result, these detectors usually suffer from low spatial resolution, high sensitivity to thermo-mechanical vibrations (and therefore a low signal to noise ratio) and long response time.

Moreover, in order to achieve a high reflectivity in the visible spectral range, the micro-cantilever beam has to include a metallic component. Since metals have a high thermal conductivity and a low Debye temperature, their use tends to reduce the thermal sensitivity of the detector.

Another type of thermal radiation detector using optical readout exploits the fact that the reflectance of a metal-dielectric interface slightly depends on temperature. In such a detector, described in the paper by S. V. Mitko, et al. "Fast Thermo-reflectance Bolometry", Proceedings Symposium IEEE/LEOS Benelux Chapter, 2003, p. 177-180, a visible or near-infrared light beam is directed to a thin metal film through a dielectric substrate, the thin metal film being exposed to an x-ray or particles flux. An increase of temperature of the metal film is detected by monitoring a variation in the reflected light intensity. Since the thermo-reflectance coefficient $\xi=1/R \cdot dR/dT$, where R is the module of the interface reflectivity and T its absolute temperature, is very small (of the order of $4 \cdot 10^{-5}$), the thermal sensitivity of such a device is rather poor.

More broadly, the invention relates to the field of micromechanical sensors for detecting an environmental condition, such as an electromagnetic field, temperature, acceleration, or the presence and concentration of chemical substances and/or biological organisms or parts thereof.

Micromechanical accelerometers and vibration meters are known, for example, from the following papers:

Nin C. Loh et al., Sub-10 $cm^3$ interferometric accelerometer with nano-g resolution, Journal of micro-electromechanical systems, v.11, N.3, 2002; and W. Vance Payne & Jon Geist: Low Cost Digital Vibration Meter, J. Res. Natl. Inst. Stand. Technol. 112, 115-128 (2007)

Micromechanical (bio)chemical sensors are known from:

Florence Quist et al.: Nano-mechanical Cantilever Motion Generated by a Surface-Confined Redox Reaction, J. Phys. Chem. B, 107, 10691-10695, 2003.

Karin Y. Gfeller et al.: Micromechanical oscillators as rapid biosensor for the detection of active growth of *Escherichia coli*, Biosensors and Bioelectronics 21, 528-533, 2005.

H P Lang et al.: An Artificial Nose Based on Microcantilever Array Sensors, Journal of Physics: Conference Series 61, 663-667, 2007

A. Vidic et al.: A new cantilever system for gas and liquid sensing, Ultramicroscopy 97, 407-416, 2003.

M. K. Bailer et al.: A cantilever array-based artificial nose, Ultramicroscopy 82, 19, 2000.

H. P. Lang et al.: An artificial nose based on a micromechanical cantilever array, Analytica Chimica Acta 393, 59-65, 1999.

Vincent Tabard-Cossa et al.: Redox-Induced Surface Stress of Polypyrrole-Based Actuators, J. Phys. Chem. B, 109, 17531-17537, 2005.

Vincent Tabard-Cossa et al.: A differential microcantilever-based system for measuring surface stress changes induced by electrochemical reactions, Sensors and Actuators B 107, 233-241, 2005.

Micromechanical (electro)magnetic field sensors are known from:

Todd G. Ruskell et al.: Field mapping with the magnetic resonance force microscope, J. Appl. Phys., Vol. 86, No. 1, 1999.

S. Lee and Y. C. Lee: Near-field imaging of high-frequency magnetic fields with calorimetric cantilever probes, Journal of applied physics 99, 08H306, 2006.

The micromechanical sensors known from prior art usually comprise two main elements: a micromechanical oscillator (most often a cantilever, sometimes a different structure such as a vibrating plate) and readout means for detecting a displacement of said micromechanical oscillator. The micromechanical sensor comprises a sensing element, responsive to an environmental condition and adapted for modifying the displacement or the resonance frequency of said micromechanical oscillator depending on said environmental condition.

For example, a (bio)chemical sensor can comprise a sensing element adapted for selectively fixing molecules or biological organisms, or parts thereof. Fixation of the substance to be detected to the sensing element increases the mass of the micromechanical oscillator, and therefore decreases its resonating frequency. Therefore, the target substance can be detected by monitoring a time-dependent displacement of the oscillator and by observing a change of its resonance oscillating frequency.

Acceleration and vibrations can be monitored by measuring the inertia-induced displacement of the oscillator, without the need for a sensing element. Electromagnetic fields can also be detected by observing the quasi-static displacement of an oscillator comprising a sensing element on which the field exerts a mechanical force: see e.g. the above-mentioned paper by Todd G. Ruskell et al.

In all these micromechanical sensors, readout is critical because very small displacements, or resonance frequency shifts, have to be detected. Prior art readout means for detecting a displacement of a micromechanical cantilever are known from:

L. Y. Beaulieu et al.: Calibrating laser beam deflection systems for use in atomic force microscopes and cantilever sensors, Applied physics letters 88, 083108, 2006; and L. Y. Beaulieu et al.: A complete analysis of the laser beam deflection systems used in cantilever-based systems, Ultramicroscopy 107, 422-430, 2007.

An object of the present invention is to provide a micromechanical sensor and/or a thermal radiation detector having an improved sensitivity and an improved signal to noise with respect to prior art devices.

Another object of the present invention is to provide a thermal radiation detector having a lesser susceptibility to thermal vibration noise.

Another object of the present invention is to provide a thermal radiation detector having a faster response than prior art devices.

Another object of the present invention is to provide a thermal imaging radiation detector having an improved spatial resolution with respect to prior art devices.

At least one of the objects above is achieved by a radiation detector comprising: an energy absorber for absorbing incident radiation to be detected and undergoing a temperature increase as a consequence of said absorption; and optical readout means, for detecting said temperature increase of the energy absorber; wherein said optical readout means comprises input coupling means for coupling a light beam to said energy absorber by exciting surface plasmons resonance, a surface plasmons resonance condition being dependent on the energy absorber temperature; and wherein said energy absorber is separated from said input coupling means by a dielectric layer.

In a radiation detector according to the invention, a readout light beam is directed to an energy absorber and, thanks to appropriate coupling means, it excites plasmons on its surface. A change of temperature modifies a surface plasmons resonance condition, which in turn affects the (complex) reflection coefficient of the illuminated surface of the energy absorber. Monitoring of this complex reflection coefficient provides a very sensitive detection of the change of temperature, and therefore of energetic radiation impinging on the energy absorber.

Use of surface plasmons resonance allows for a significant modification of the reflection coefficient even upon a very slight temperature variation; as it will be shown later, the interface reflectivity can show a temperature dependence of about $4 \cdot 10^{-2}/K$, three orders of magnitude greater than in prior art thermo-reflectance bolometers. This means that a very sensitive thermal detector can be obtained. A satisfactory thermal sensitivity can therefore be achieved even by use of a miniaturized thermo-sensitive part, which allows a better spatial resolution, a reduced susceptibility to thermal vibration noise and a faster response.

Moreover, in an advantageous embodiment of the invention, the thermo-sensitive part of the detector does not comprise any metallic part, which further increases the sensitivity of the device. In any case, the use of a dielectric layer for thermally isolating the (usually small) energy absorber from the (bulky) coupling means allows achieving a very satisfactory sensitivity.

In particular embodiments of the invention, the radiation absorbing part of the detector comprises a multilayer structure including at least a conducting layer for supporting surface plasmons and a dielectric layer. A temperature variation can induce either a thickness variation of a dielectric layer or a change of the dielectric permittivity of a conducting layer.

In the first case, the detector can comprise a thermo-sensitive bi-material (or more generally multi-material) microcantilever beam, the varying thickness dielectric layer actually being a gap disposed adjacent said bi-material cantilever, whereby a flexion of said cantilever induces a change of the width of said gap. Unlike in prior art devices, the cantilever need not directly reflect visible light, therefore it can be entirely made of dielectrics. Moreover, the high sensitivity provided by the exploitation of surface plasmons resonance allows using smaller cantilevers than in prior art devices.

In the second case, the thermo-sensitive part of the device is the conducting layer supporting surface plasmons. A detector according this second embodiment of the invention does not comprise any moving part, therefore it can have a much faster response than a detector according to the first embodiment, which has better temperature sensitivity.

Excitation of surface plasmons is made possible thank to coupling techniques which are well known from prior art: dielectric prisms in either Kretschmann-Raether or Otto configuration, or volume or surface relief gratings.

The invention is directed to both individual detectors and to bi-dimensional arrays of such individual detectors for imaging applications.

The radiation detector of the kind comprising a bi-material cantilever beam can be considered a specific embodiment of the micromechanical sensor according to another aspect of the invention. Such a sensor comprises a micromechanical oscillator (more particularly, in the form of a cantilever beam) and optical readout means for detecting a displacement of said micromechanical oscillator; wherein said optical readout means comprise input coupling means for coupling a light beam to a conductive surface by exciting surface plasmons resonance, a surface plasmons resonance condition being dependent on the displacement of said micromechanical oscillator.

The invention allows achieving a much greater sensitivity than prior art micromechanical sensor thank to the use of a readout technique based on surface plasmon resonance (SPR) instead of e.g. direct reflection of light by a cantilever beam. Indeed, even a very small displacement of the micromechanical oscillator can induce a very strong variation of the plasmon-induced reflection losses, and therefore a strong reflectivity signal. In turn, the increased signal-to-noise ratio of the reflectivity signal allows measuring tiny displacements or frequency shifts.

According to different embodiments of the sensor of the invention:
  Said micromechanical oscillator can be spaced from said input coupling means by a gap, said surface plasmons resonance condition depending on the thickness of said gap. This is the same operating principle already discussed with reference to the cantilever-based thermal radiation detector of the invention.
  Said input coupling means can comprise a dielectric body having a surface coated by a conducting layer, said input coupling means being adapted for exciting surface plasmons within said conducting layer.
  Alternatively, said input coupling means can comprise a dielectric body having a dielectric surface which is separated from said micromechanical oscillator by said gap, said micromechanical oscillator comprises, preferably on its surface which is oriented towards the input coupling means, a conducting layer, said input coupling means being adapted for exciting surface plasmons within said conducting layer.
  Said micromechanical oscillator can comprise at least a sensing element, such as a sensing layer, adapted for sensing an environmental condition and for modifying the displacement or the resonance frequency of said micromechanical oscillator depending on said environmental condition.
  As discussed above, said sensing element can be:
    A chemical sensing element adapted for fixing molecules to be detected, thus modifying the mass or the stiffness of said micromechanical oscillator, or inducing a displacement thereof.
    A biological sensing element adapted for fixing biological microorganisms, or parts thereof, thus modifying the mass or the stiffness of said micromechanical oscillator, or inducing a displacement thereof.
    An electromagnetic field sensing element adapted for experiencing a force when immerged in an electromagnetic field, thus inducing a displacement of said micromechanical oscillator. Or,
    A thermal sensing element adapted for experiencing a differential thermal expansion when its temperature deviates from a reference temperature, thus inducing a displacement of said micromechanical oscillator (i.e., the bi-material or multi-material beam used in the thermal radiation detector). In this case, the sensor can further comprise a radiation absorbing element for absorbing incident radiation and thus heating said thermal sensing element.

The invention is also directed to a sensing device comprising such a micromechanical sensor, and further comprising an optical radiation source for generating a polarized light beam having at least a component with TM-polarization with respect to said conductive surface and directing it to said input coupling means for coupling to said conductive surface.

The sensing device can further comprise an optical detector for detecting a reflected part of said light beam coupled to said conductive surface by said input coupling means.

The sensing device can further comprise signal processing means for determining a displacement of said micromechanical oscillator from an intensity of said reflected part of said light beam. Said signal processing means can be further adapted for determining an oscillating frequency of said micromechanical oscillator from a time-dependent intensity of said reflected part of said light beam.

The device can further comprise means for exciting an oscillation mode of said micromechanical oscillator. Adapted means are known from the field of atomic force microscopy (AFM).

The invention is also directed to an analytical device comprising a one- or bi-dimensional array of individual micromechanical sensors, each individual sensor being provided with a different sensing element for sensing a different environmental condition.

Figure 1B:
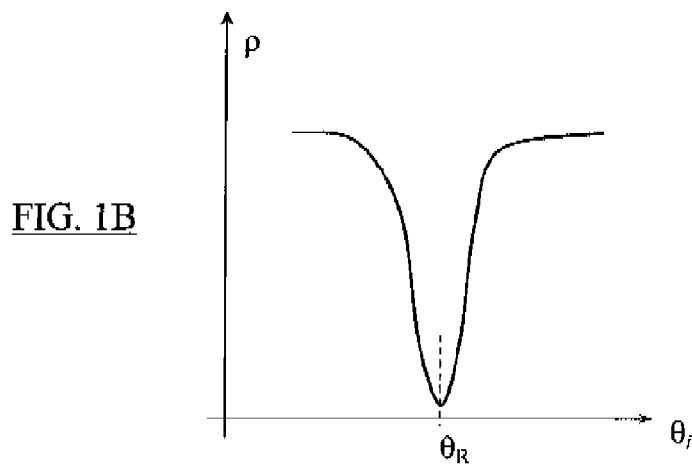
Figure 1C:
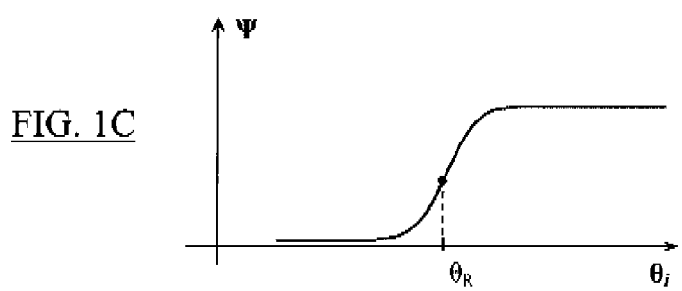
Figure 2A:
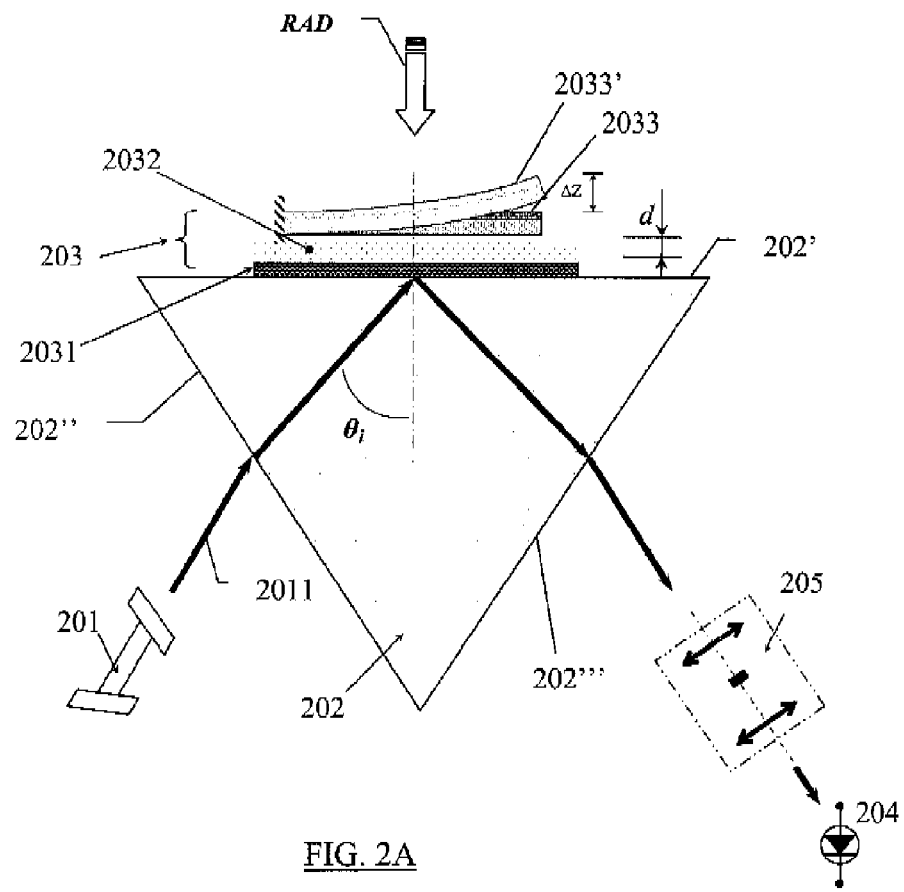
Figures 2B, 2C:
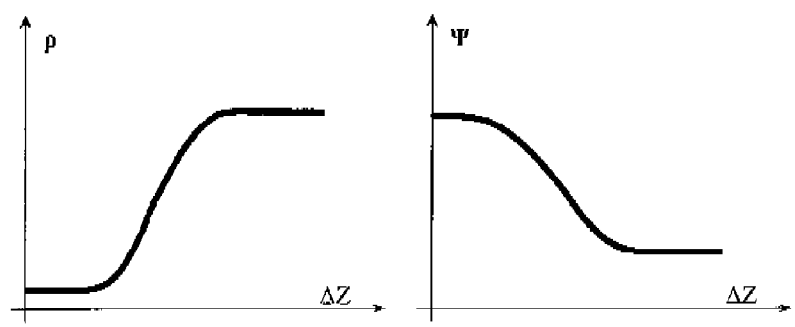
Figure 3:
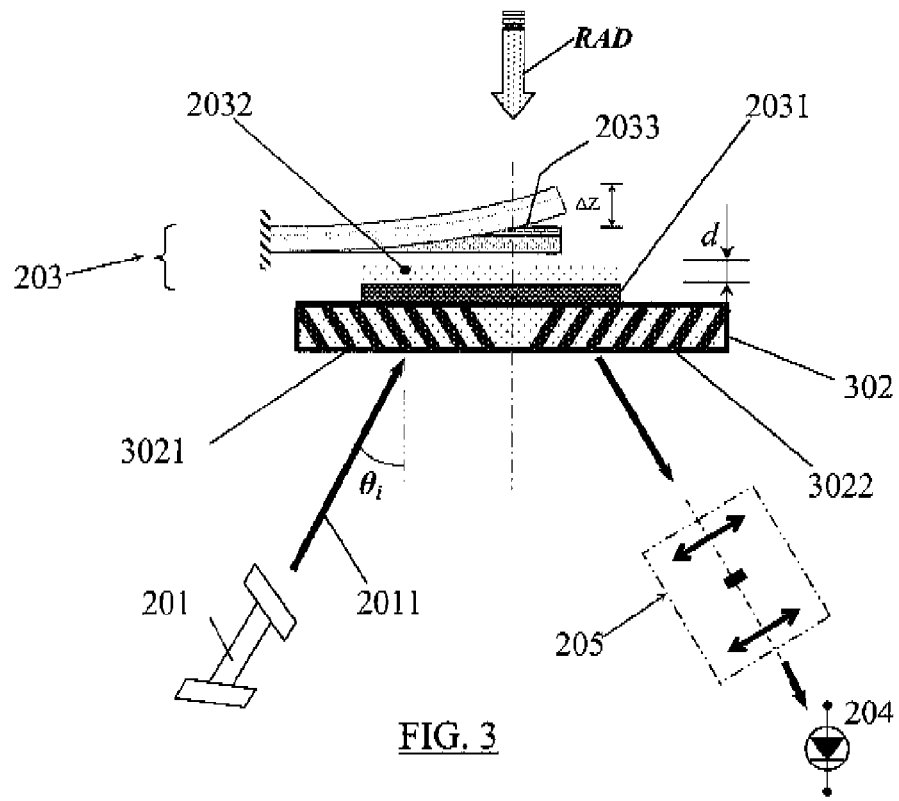
Figure 4:
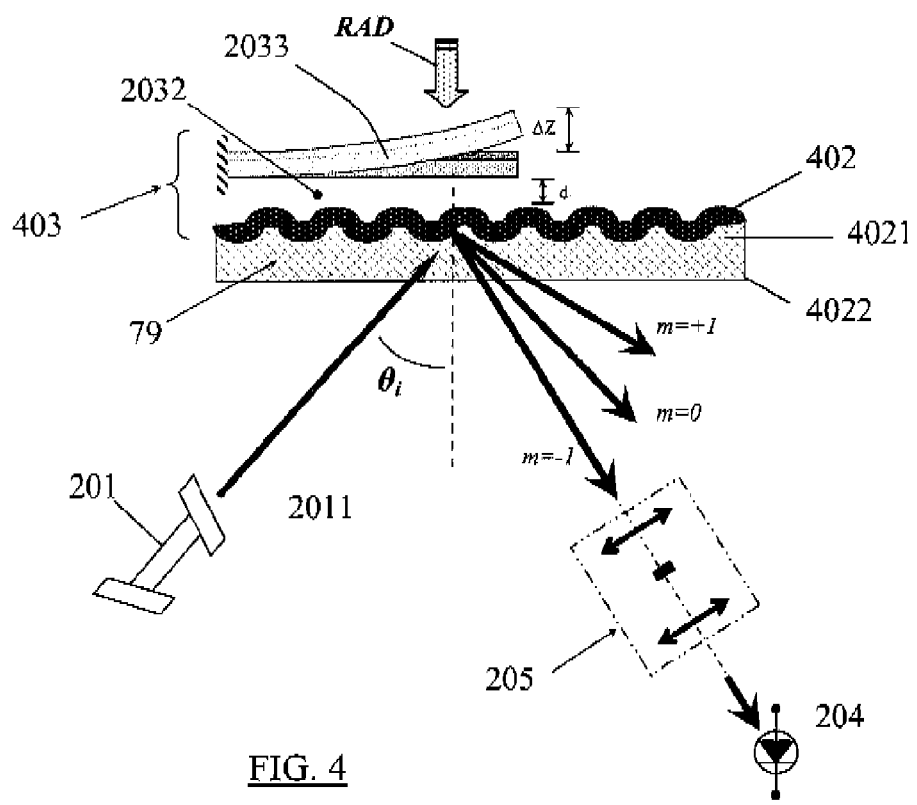
Figure 5:
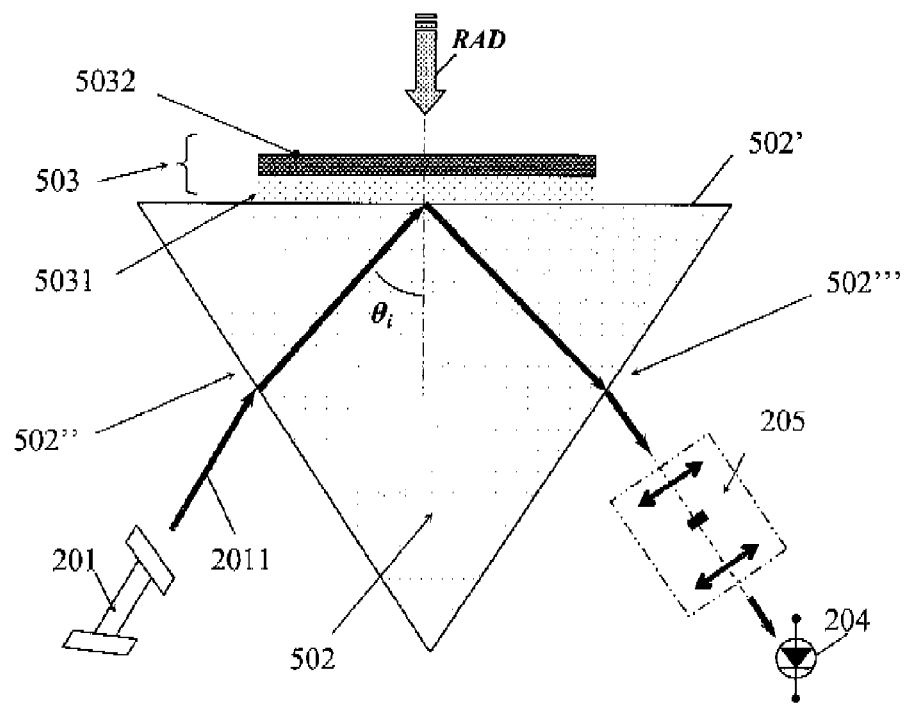
Figure 6:
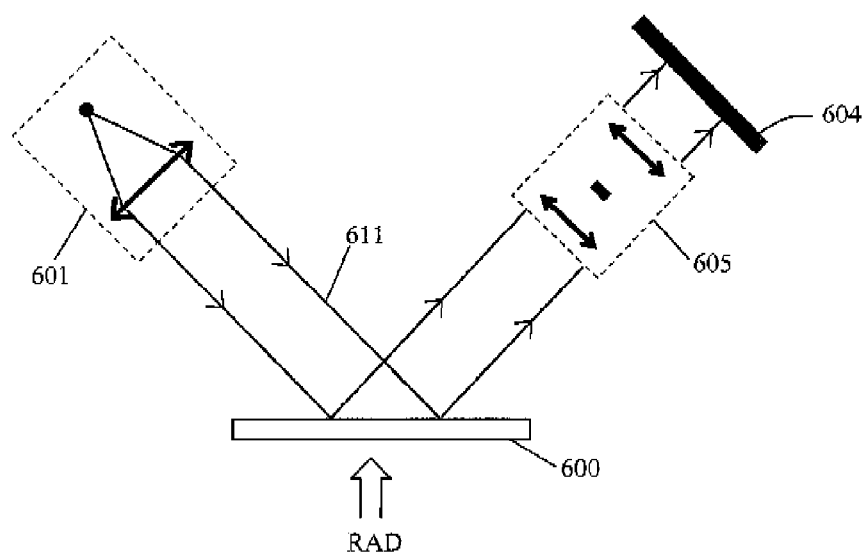
Figure 7:
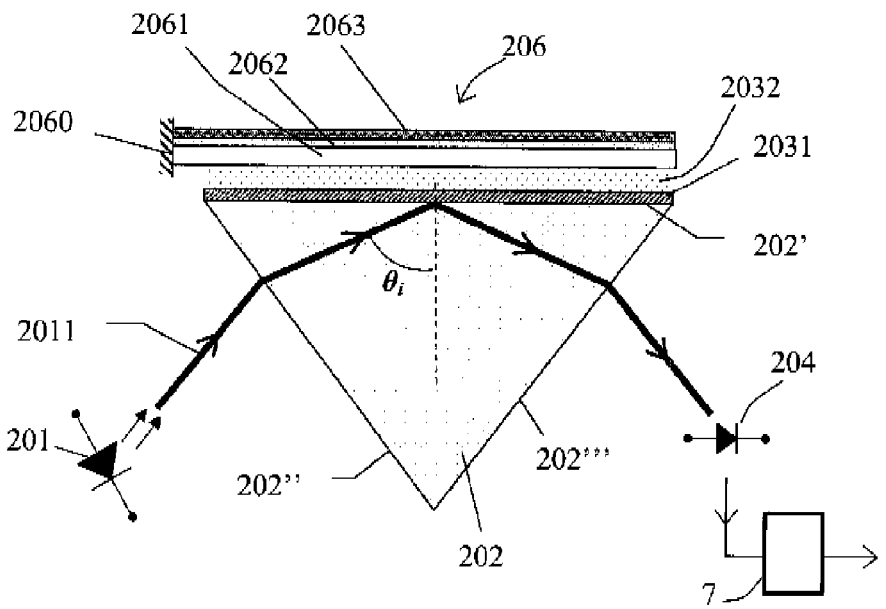
Figure 8:
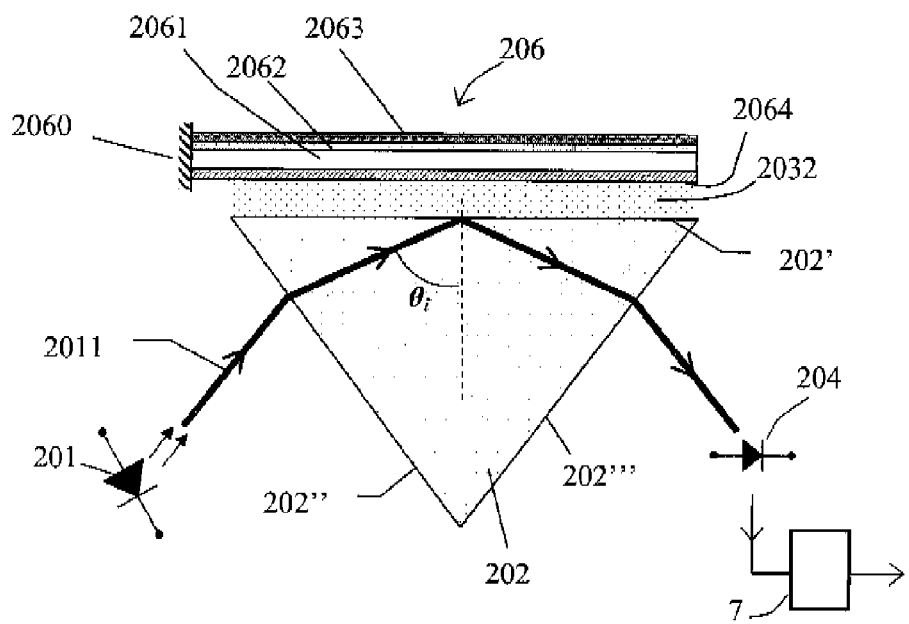

Additional features and advantages of the present invention will become apparent from the subsequent description, taken in conjunction with the accompanying drawings, which show:

FIG. 1A, a scheme of the Kretschmann-Raether technique for exciting surface plasmons;

FIGS. 1B and 1C, the dependence of module and phase of the complex reflection coefficient of a dielectric-metal interface on the light incidence angle at or near surface plasmons resonance;

FIG. 2A, a scheme of a detector according to a first embodiment of the invention;

FIGS. 2B and 2C, the dependence of module and phase of the complex reflection coefficient of a dielectric-metal interface on the width of a gap in the energy absorber part of the detector of FIG. 2A;

FIG. 3, a scheme of a detector according to a second embodiment of the invention;

FIG. 4, a scheme of a detector according to a third embodiment of the invention;

FIG. 5, a scheme of a detector according to a fourth embodiment of the invention;

FIG. 6, a scheme of an imaging detector according to a fifth embodiment of the invention;

FIG. 7, a scheme of a micromechanical sensor according to a sixth embodiment of the invention; and FIG. 8, a scheme of a micromechanical sensor according to a seventh embodiment of the invention.

In the figures, like reference numerals refer to like features.

Surface plasmons are quantified oscillations ("eigenmodes") of free electrons that propagate along the surface of a conductor such as a metal thin film. Surface plasmons do not couple to freely-propagating electromagnetic radiation, therefore they cannot be excited by simply illuminating the surface of a conductor with a light beam, whatever its wavelength and incidence angle, because of a wave vector mismatch between plasmons and photons. However, plasmons do couple with evanescent waves produced by total reflection at the interface between two dielectric media; this is the basis of the Kretschmann-Raether coupling technique, which will be now discussed with reference to FIG. 1A.

A dielectric prism 101 is disposed with its base 101' over a metallic thin film 102, which can support plasmons. A light beam 103 is incident on a side face 101" of prism 101, is refracted and impinges on the base 101" with an incidence angle $\theta_i$; it can be shown on the basis of classical electrodynamics that the light beam 103 is reflected at the dielectric 101—metal 102 interface and exits the prism 101 through an opposed side face 101''', while evanescent waves 104 are induced in the metal 102. If the light beam 103 has a transverse magnetic field component with respect to the metallic surface 102 (TM component), there is a resonance value OR of the incidence angle $\theta_i$ for which the component of the wave vector of the incident light, beam parallel to the surface of the metal thin film, equals the wave vector of the surface plasmon wave, and therefore evanescent waves 104 can excite plasmons waves on the metallic thin film 102—free space interface 102' opposite to the prism 101. Fulfillment of the surface plasmons resonance (SPR) condition $\theta_i=\theta_R$ can be observed as a narrow and deep minimum of the intensity of the reflected light, accompanied by a sudden phase shift. FIGS. 1B and 1C qualitatively show the dependence of the modulus $\rho$ and of the phase $\psi$ of the reflection coefficient $r=\rho \cdot e^{i\psi}$ as a function of the incidence angle $\theta_i$ at or near surface plasmons resonance.

Although the technique is the most widely used, it is not the only one. The Otto technique only differs from the Kretschmann-Raether scheme in that a thin (usually a few tens of nanometer) air gap is interposed between the prism and a metal surface, so that light undergoes total internal reflection at the prism—air interface; in the Otto scheme, plasmons are induced on the metal surface oriented toward the prism. Other surface plasmons excitation methods include the use of a dielectric volume grating replacing the prism and illumination of a metallic surface or thin film shaped in the form of a diffraction grating.

A general introduction to the physics of plasmons can be found in Ch. Kittel "Introduction to Solid State Physics", 3rd edition, John Wiley and Sons, New York 1996, chapter 8. More specific information on surface plasmons resonance and plasmon-light coupling techniques can be found in the paper by H. Raether, "Surface plasmons on smooth and rough surfaces and on gratings", Springer tracts in modern physics, vol. 111, Springer-Verlag Berlin Heidelberg New York, 1988, p. 5-40 and in the paper by A. Otto, "The surface polariton resonance in attenuated total reflection", in Polaritons, Pergamon press, New York, 1974, p. 117-121.

FIG. 2A shows a schematic view of a surface plasmon resonance thermal detector based on the Kretschmann-Raether SPR configuration according to a first embodiment of the present invention. The detector comprises a transverse-magnetic (TM) polarized light source 201, a glass prism 202, a multilayer structure 203 deposed on a base face 202' of the prism and an optical detector 204. The multilayer structure 203 includes a metallic thin film 2031 of highly conducting metal (eg. silver, gold, copper, aluminum) evaporated on the base face 202' of prism 202 and a bi-material micro-cantilever beam 2033 disposed at a distance d from said metallic thin film 2031 and having a radiation-absorbing surface 2033' exposed to an incident radiation to be detected. Gap 2032 between the thin film 2031 and the micro-cantilever beam 2031 constitute, from an optical point of view, a dielectric layer of the multilayer structure 203; it will be understood that gap 2032 can be void or filled with air or any other suitable gaseous medium. The thickness of the metal thin film 2031 is generally comprised between 10 and 100 nm, and is carefully determined so as to optimize the operation of the detector.

A TM-polarized visible or near-infrared light beam 2011 emitted by the light source 201 is refracted by a first side face 202" of the prism 202 and impinges on the base face 202' with an incidence angle $\theta_i$; satisfying the surface plasmon resonance $\theta_i=\theta_R$; as a consequence plasmons are excited in the thin metallic film 2031. Light reflected by the glass-metal interface exits the prism through the opposite side face 202''' and reaches optical detector 204, which allows a measurement of the reflectivity $R=|\rho|^2$ of the glass-metal interface and therefore of the module $\rho$ of its reflection coefficient. This reflectivity is lower than it would be expected from the optical properties of the thin metallic film 2031 and of the prism 202, because a fraction of the incident optical energy is absorbed by the plasmon generation process.

When radiation RAD to be detected impinges on the micro-cantilever beam 2033, it is absorbed and its energy converts to heat. As a result, said micro-cantilever beam 2033 undergoes a temperature increase and, due to its bi-material structure, it flexes, thus modifying (increasing, in the case depicted in the figure) the width of the air-filled gap 2032 by an amount $\Delta z$, which is proportional to the temperature increase and therefore to the energy of the absorbed radiation.

It can be shown with the help of numerical simulation based on the solution of Maxwell equations with the appropriate boundary conditions, that the surface plasmon resonance angle $\theta_R$ does not only depend on the properties of the glass prism 202 and of the metallic thin film 2031, but is a function of the optical properties of the whole multilayer structure 203. This means that the heat-induced flexion of the micro-cantilever beam 2033 modifies the surface plasmon resonance angle $\theta_R$ so that the resonance condition $\theta_i=\theta_R$ is no longer fulfilled. This provokes an increase of the interface reflectivity, which is monitored by the optical detector 204.

As already discussed, surface plasmon resonance angle does not only affect the module $\rho$ of the glass-metal interface reflection coefficient, but also its phase $\psi$. As a consequence, heat-induced flexion of the micro-cantilever beam 2033 can also be detected by monitoring the phase of the reflected portion of the light beam 2011, and indeed this allows achieving a greater sensitivity. For this reason, the detector of FIG. 2A also comprises an interferometric device 205 for converting a phase change of the light beam 2011 to an intensity change, which can be directly measured by the optical detector 204. An example of such an interferometric device is constituted by a spatial filtering arrangement including a Zernike dephasing plate, as described in the book by J. W. Goodman "Introduction to Fourier Optics", McGraw-Hill, 1968, chapter 7-1.

FIGS. 2B and 2C, respectively show the qualitative dependence on $\Delta z$ of the amplitude $\rho$ and the phase $\psi$ of the complex reflection coefficient of the glass-metal interface when the incident angle $\theta_i$; is fixed at the resonance value for $\Delta z=0$, indicated by $\theta_R$. Surface plasmon resonance is so sensitive that values of $\Delta z$ as small as $10^{-2}$-$10^{-1}$ nm can originate measurable variations of the reflection coefficient. For practical applications the measuring resolution is of about 1-2 nm, which is already much less than in prior art micro-opto-mechanical thermal detectors for which the minimum detectable deflection of the cantilever beam is of the order of a fraction of the wavelength of the readout light beam, i.e. several tens or some hundreds of nanometers.

The smaller measuring resolution of the vertical deflection of the cantilever beam allows a better energy resolution than in prior art detectors, if the size of said cantilever beam is kept constant. For a given energy resolution, surface plasmon resonance allows using a shorter cantilever beams, which in turn reduces the sensitivity of the detector to vibrations and thermal fluctuations and increases the speed of its response.

The light source 201 is preferably constituted by a monochromatic visible or near-infrared emitter such as a laser, optionally provided with a polarizer. The optical detector 204 can be chosen between: a photodiode, a photomultiplier, a charge-coupled device and a photosensitive sheet. In order to increase the temperature variation induced by the absorbed energy it is preferred to use a bi-material micro cantilever beam made only of dielectric insulators having high Debye temperature and low thermal conductivity, e.g. a silicon oxide, silicate glass, silicon nitride ($Si_3N_4$).

As discussed above, surface plasmon resonance is sensible to very small variations of the thickness of the air-filled air gap 2032, which in turn allows using shorter cantilever beams 2033 than in prior art micro-opto-mechanical thermal detectors. This means than pixels can be smaller, and therefore that the achievable spatial resolution in imaging application can be higher than it would be possible by using prior art detectors.

The second embodiment of the invention, represented on FIG. 3, only differs from the first one by the nature of the input coupling means used for coupling the incident light beam 2011 to the glass-metal interface in order to excite surface plasmons and of the output coupling means used for coupling the reflected portion of said light beam to the optical detector 204. While in the first embodiment these input and output coupling means were constituted by the opposite side faces 202", 202"' of the dielectric prism 202, in the second embodiment they are constituted by two opposite sides 3021, 3022 of a volume grating 302 on a top surface of which is evaporated the metallic thin film 2031.

This embodiment of the invention is noteworthy because the use of a volume grating as a coupling means allows for miniaturization of the device, which is particularly important for high-definition imaging applications.

The third embodiment of the invention, represented on FIG. 4, also distinguishes itself only by the nature of the input and output coupling means. In this third embodiment, a single metallic relief grating 402 coated onto a relief grating 4021 built in a transparent supporting plate 4022 accomplishes both the input and output coupling system. The metallic coating 402 is not only an element of the coupling means, it also constitutes the conducting layer of the multilayer structure 403 supporting the surface plasmons (multilayer structure 403 correspond to the multilayer structure 203 of FIGS. 2A and 3, but it is indicated by a difference reference numeral because it comprises the non-flat layer 402). Otherwise stated, the metallic relief grating 402 simultaneously belongs to the optical coupling means and to the multilayer structure 503, which are completely separate elements in the previously described embodiments.

As it can be seen on the figure, the light beam 2011 impinges on the back face of the transparent supporting plate 4022, propagates through its thickness and is diffracted by the metallic relief grating 402, working in reflection (diffraction orders m=−1, 0 and 1 are shown), thus exciting surface plasmon resonance on the same grating 402. Diffracted light e.g. at order m=−1 or 1 is detected by the optical detector 204. Advantageously, grating 402 is designed in order to maximize the diffraction energy for a given diffraction order $m_{max}$, which is used for detection.

This third embodiment is interesting because it allows simplifying and further miniaturizing the device, for the reason that the input and optical coupling functions are both accomplished by a single element, which is at the same time the plasmon-supporting conducting layer.

While the first, second and third embodiments of the invention can be considered to be variants of the same device, distinguishing from each other only by their optical coupling means, the fourth embodiment represented on FIG. 5 operates on the basis of a rather different mechanism.

In this embodiment, like in the first one, input and output optical coupling means are constituted by two opposite side faces 502", 502"' of a dielectric (glass) prism 502, on a base face 502' of which is disposed a radiation-absorbing multilayer structure 503. Unlike in the first embodiment, however, multilayer structure 503 comprises an air-filled gap 5031 disposed between the prism base face 502' and a plasmons-supporting thin metal layer 5032, the latter being directly exposed to a flux of radiation RAD to be detected. A visible or near infrared TM-polarized light beam 2011 impinges on the input coupling face 502" of the prism, is refracted, then it impinges on the base face 502', undergoes total internal reflection at the glass-air interface and exits the prism via the output coupling face 502"'; if the incidence angle $\theta_i$ of light beam 2011 is properly chosen, evanescent waves above the glass-air interface excite surface plasmons in the thin metal film 5032 via the Otto coupling mechanism, and this results in a reflectivity significantly lower than 1. It will be understood that gap 5031, whose thickness is generally comprised between 50 nm and 5 μm, can be replaced by a solid dielectric layer having a refractive index lower than that of prism 502, so that total internal reflection can happen at the interface.

Heating of the plasmons-supporting thin metal film 5032 by radiation RAD determines a change of its dielectric permittivity, and therefore of the surface plasmons resonance conditions. Therefore, when the temperature of said thin metal film 5032 increases, the resonance incidence angle $\theta_R$ become different from the effective incidence angle $\theta_i$ of light beam 2011, and the plasmons generation efficiency drops. Like in previously described embodiments, this determines a sudden change the amplitude $\rho$ and the phase $\psi$ of the complex reflection coefficient of the glass-multilayer structure interface which can be monitored by optical means.

This fourth embodiment is noteworthy because it does not include any moving part. As a consequence, it shows a faster response and a much lower susceptibility to thermal vibration noise than the previously described devices.

Thermomechanics and thermo-optical effects can also be combined in a single device having a structure of the kind represented on FIG. 2A, 3 or 4, in which the bi-material cantilever beam 2033 includes at least a material whose dielectric permittivity depends on temperature. The synergy between the two effects can increase the spectral bandwidth of the detector, improve its sensibility and/or allow a further reduction of its size, which is particularly advantageous in high-spatial resolution imaging applications.

Thermal detectors based on surface plasmon resonance can be very advantageously used in imaging application. Their simple structure allows building large (e.g. 1000×1000, much more than it would be possible with electrical readout micro-bolometers) bi-dimensional arrays of such detectors, each one of them constituting a pixel. As discussed above, detectors according to the invention can be significantly smaller than prior art thermal detectors using electro-optical readout; this allows achieving a much greater spatial resolution in imaging applications.

The general structure of an imaging detector according to the invention is depicted on FIG. 6. Light source 601 generates a collimated readout light beam 6011 simultaneously illuminating all the pixels of a bi-dimensional array 600 of thermal detectors based on surface plasmon resonance; collimation of the readout light beam 6011 is important, because the incidence angle must be the same for all the individual detectors (pixels). The bi-dimensional spatial distribution of an incoming radiation or particle flux RAD induces a spatially-varying reflectivity variation of the illuminated surface of the array 600, and therefore a spatial modulation of the reflected light, which is directed to an imaging optical detector 604, usually a CCD bi-dimensional array. In short, surface plasmon resonance devices convert the spatial distribution of an incoming radiation or particle flux into a spatial distribution of a reflected light beam, which can be easily detected by conventional means.

Optionally, spatial filtering means 605 can be interposed between the thermal detector array 600 and the CCD array 604 in order to process the optical image.

Bi-dimensional array can be based on any kind of detector described above; detectors using grating as input/output coupling means (FIGS. 3 and 4) are generally preferred to detectors using prisms because of their reduced dimensions.

Numerical simulations have been performed in order to determine the theoretical performances of thermal detectors according to the first and fourth embodiments of the invention. The simulations make use of the Fresnel matrix method for computing the optical properties of the radiation-absorbing multilayer structures (see G. J. Sprokel, "The reflectivity of a liquid crystal cell in a surface plasmons experiment, Mol. Cryst. Liq. Cryst., Vol. 68, No. 4,1981, p. 39-45).

A first simulation has been performed for a device of the kind represented on FIG. 2A, characterized by the following parameters:

| Refractive index of prism 202: | 1.500 |
|---|---|
| Thickness of air gap 2032: | 500 nm |
| Metal later 2031: | |
| | |
| Thickness: | 32 nm |
| Composition: | silver |
| Debye temperature: | 225 K |
| Mass density: | 10.5 g/cm$^2$ |
| Atomic weight: | 107.87 g/mole |
| Temperature coefficient of resistance: | 4100 ppm/K |
| Dielectric permittivity: | −18.2 + 0.5 i |
| Cantilever 2033: | |
| | |
| composition: | gold/Si$_3$N$_4$ |
| thickness: | 50 nm/50 nm |
| Pixel size: | 70 μm × 10 μm |
| Ambient temperature: | 18° C. |

The results of this first simulation are as follows:

| SPR angle $\theta_R$: | 45°30' |
|---|---|
| Thermal resolution: | 0.013 K |
| Energy resolution: | 0.001 nJ |

A second simulation has been performed by replacing the gold metal layer of the cantilever beam by a SiO$_2$ layer. The thicknesses of air gap 2032 and of the metal later 2031 have been slightly modified, as follows:

| Thickness of air gap 2032: | 885 nm |
|---|---|
| Thickness of metal later 2031: | 43 nm | all other parameters being unchanged.
The results of this second simulation are as follows:

| SPR angle $\theta_R$: | 43°23' |
|---|---|
| Thermal resolution: | $3 \cdot 10^{-4}$ K |
| Energy resolution: | $1.8 \cdot 10^{-5}$ nJ |

As expected, the use of an all-dielectric cantilever improves the energy resolution of the device by almost two orders of magnitude.

A third simulation has been performed by reducing the pixel size and using a gold metal layer, all other parameters remaining unchanged with respect to the first simulation:

| Pixel size: | 25 μm × 10 μm |
|---|---|
| Metal later 2031: | |
| | |
| Thickness: | 42 nm |
| Composition: | gold |
| Debye temperature: | 165 K |
| Mass density: | 19.32 g/cm$^2$ |
| Atomic weight: | 196.97 g/mole |
| Temperature coefficient of resistance: | 3800 ppm/K |
| Dielectric permittivity: | −11.54 + 1.2 i |

The results of this third simulation are as follows:

| SPR angle $\theta_R$: | 46°15' |
|---|---|
| Thermal resolution: | 0.23 K |
| Energy resolution: | 0.001 nJ |

It can be observed that replacing silver by gold allows reducing the cantilever length from 70 nm to 25 nm, which allows for a better spatial resolution in imaging applications. This is due to the fact that the length of the cantilever beam has to be at least equal to the propagation length of surface plasmon, which is shorter in gold than in silver. An additional advantage of gold over silver is its greater chemical stability. On the other hand, silver allows achieving a better energy resolution.

A fourth simulation has been performed for a device of the kind represented on FIG. 5 (fourth embodiment), characterized by the following parameters:

| Refractive index of prism 502: | 1.500 |
|---|---|
| Thickness of air gap 5031: | 1010 nm |
| Metal later 5032: | |
| | |
| Thickness: | 130 nm |
| Composition: | silver (same physical properties as in the first example) |
| Pixel size: | 70 μm × 10 μm |
| Ambient temperature: | 18° C. |

The results of this fourth simulation are as follows:

| | |
|---|---|
| SPR angle $\theta_R$: | 43°28' |
| Thermal variation of the reflectivity | 4%/K |
| Thermal resolution: | 0.087 K |
| Energy resolution: | 0.02 nJ |

Energy resolution is not as good as in devices based on the cantilever beam principle. However, the lack of moving parts allows a faster operation and reduces the sensitivity to mechanical vibrations.

A fifth simulation has been performed for a device of the same kind, using a gold metal layer and a smaller pixel size:

| | |
|---|---|
| Thickness of air gap 5031: | 590 nm |
| Metal later 5032: | |
| Thickness: | 130 nm |
| Composition: | gold (same physical properties as in the second example) |
| Pixel size: | 25 µm × 10 µm |

All other parameters are the same as in the third example. The results of this fifth simulation are as follows:

| | |
|---|---|
| SPR angle $\theta_R$: | 44°25' |
| Thermal variation of the reflectivity | 3.8%/K |
| Thermal resolution: | 0.2 K |
| Energy resolution: | 0.08 nJ |

Use of gold instead of silver allows a reduction of the pixel size, but this is only obtained at the expense of energy resolution.

As represented on FIG. 7, a micromechanical sensor according to a sixth embodiment of the invention is essentially based on the same structure as the thermal detector of FIG. 2A. A dielectric prism 202 couples a light beam 2011 to a conducting layer 2031, coating a surface 202 thereof; as known from prior art, when appropriate conditions are met, SPR is excited in layer 2031 by Kretschmann-Raether coupling. In a preferred form of the invention, layer 2031 is made of silver or gold.

A cantilever beam 206 is disposed above the layer 2031, separated from it by a micrometer- or submicrometer-wide gap 2032; as already discussed, the conditions for SPR are strongly affected, among other factors, by the width of gap 2032. It is important to take into account that, in FIGS. 7 and 8, the thickness of cantilever beam 206 and the width of the gap 2031 are grossly exaggerated with respect to the size of the other elements.

Cantilever beam 206 is fixed by an end thereof to a supporting structure 2060 and it comprises a main, or structural, layer 2061, made e.g. of silicon, a piezoelectric layer 2062 and a sensing layer 2063.

Piezoelectric layer 2062 is used for exciting a flexion mode of oscillation of the cantilever beam 206, as known from the field of atomic force microscopy (AFM). This layer is only necessary when detection of the environmental parameter of interest requires the observation of a resonance frequency shift; if only a quasi-static displacement or deflection of the cantilever is to be observed, the piezoelectric layer can be omitted.

Sensing layer 2063 is adapted for sensing an environmental condition and for modifying the displacement or the resonance frequency of said micromechanical oscillator depending on said environmental condition. According to different embodiments of the invention, sensing layer 2063 can take several different forms.

For example, layer 2063 can selectively absorb or adsorb a chemical substance and swallow, thus deflecting cantilever beam 206. Sensing layers suitable for this application are described by the above-referenced papers from M. K. Bailer et al. and from H. P. Lang et al.

Absorption or adsorption of chemical substances or biological organisms increases the mass of the cantilever, and therefore lowers its resonance frequency. Such a detection scheme is described by the above-referenced paper from A. Vidic et al. in the art of chemical sensing, and by the paper of K. Y. Gfeller et al. in the art of biological sensing.

Absorption or adsorption of chemical substances Absorption or adsorption of chemical substances can also bend a cantilever by inducing surface stresses, as described by F. Qusit et al. and V. Tabard-Cossa et al.

Alternatively, layer 2063 can be a magnetic layer: when immerged in an inhomogeneous magnetic field, such a layer experiences a force which deflects the cantilever. A sensing layer adapted for magnetic field detection is described by the above-referenced paper from L. Y. Beaulieu et al.

It should be understood that these are only non-limitative examples.

The thermal radiation detector of FIG. 2A can be considered a particular embodiment of the sensor of FIG. 5, wherein one of the two layers composing the bi-material cantilever 2033 acts as a temperature-sensing layer.

Sensing layer 2063 is not an essential feature of the invention: a device whose cantilever 206 only comprises structural layer 2061 can be used as an accelerometer or a vibration detector. Indeed, in this case the "environmental parameter" to be detected is the inertia force acting on the cantilever beam itself and inducing a (time dependent) bending thereof.

The device of the invention can be used for sensing a vibration of a predetermined frequency, i.e. originated by a sonar. Advantageously, in this case, the micromechanical oscillator can be tuned to the frequency of said vibration.

Surface plasmon resonance, by itself, only allows measuring the width of gap 2032, and therefore detecting a displacement or deflection of cantilever beam 206. In some cases, however, the sensing layer 2063 does not induce a displacement of the micromechanical oscillator, but only a shift of its oscillating frequency. Said shift can be measured by monitoring a time-dependent displacement: even in this case, the use of SPR detection is useful for improving the sensitivity and the signal-to-noise ration of the sensing device;

On FIG. 7, signal processing means for measuring the oscillating frequency of cantilever 206 are indicated by reference 7.

FIG. 8 shows a different embodiment of a sensor of the invention, wherein a conducting layer 2064 is provided on the "lower" surface of the cantilever beam 206, instead of on the "upper" surface 202' of prism 202. This detector is based on the Otto SPR coupling scheme, while the detector of FIG. 7 uses Kretschmann-Raether coupling. Apart from that, operation of the two sensors is basically the same.

In an alternative embodiment, conducting layer 2064 could be disposed on the "upper" surface of the cantilever beam 206, or be embedded in the structure thereof. However, it is generally preferred to dispose the conducting layer on the surface of the cantilever which is oriented towards the coupling means 202.

The sensor of the invention is not limited to the embodiment represented on FIGS. 7 and 8. In particular, the coupling means represented on FIGS. 3 and 4 can be used instead of prism 202. Moreover, one- or bi-dimensional arrays of these sensors can be formed and used in an "imaging" system analogous to that represented on FIG. 6. Such an array of sensors is particularly useful in the chemical and biological arts, because it allows performing multiple chemical/biological analysis with a single, miniaturized device and in a single operation. See for example the above-referenced papers from M. K. Bailer et al. and from H. P. Lang et al.

More broadly, an array of sensors according to the invention can comprise sensors provided with different sensing layers for sensing, at a same time, a plurality of different chemical, biological and/or physical environmental conditions.

An array of sensors having equivalent sensing layers, for sensing a same environmental condition, can be useful for performing detection with spatial resolution. For example, an array of chemical sensors can be used to monitor the spatial distribution of a gaseous effluent.

It should be understood that the micromechanical oscillator can take different forms than a cantilever beam. For example, the above-referenced paper from N. C. Loh et al. describes a micromechanical oscillator having a completely different structure.

Means for exciting oscillation of the micromechanical oscillator can also take different forms, e.g. electrostatic or magnetic actuators. However, piezoelectric actuators are particularly advantageous.

Finally, the sensing element does not necessary take the form of a layer coating a substantial portion of the oscillator surface. In some embodiments, a miniaturized sensing element could be disposed e.g. on the tip of an oscillating cantilever beam.

The invention claimed is:

1. A radiation detector comprising:
    an energy absorber, for absorbing incident radiation (RAD) to be detected and undergoing a temperature increase as a consequence of said absorption; and
    optical readout means, for detecting said temperature increase of the energy absorber;
    said optical readout means comprises input coupling means for coupling a light beam to said energy absorber by exciting surface plasmons resonance, a surface plasmons resonance condition being dependent on the energy absorber temperature;
    said energy absorber comprising a multi-layer structure including a conducting layer for supporting surface plasmon and a dielectric layer or a gap whose thickness or width changes upon temperature variation of at least a part of the energy absorber;
    said energy absorber further comprising a multi-material cantilever adapted for flexing upon a temperature variation; and
    said dielectric layer or gap separating the multi-material cantilever of the energy absorber from said input coupling means;
    whereby a flexion of said cantilever induces a change of width of the gap; and
    wherein the multi-material cantilever is made only of dielectric material.

2. The radiation detector according to claim 1, wherein said conducting layer is made of a material chosen from gold or silver.

3. The radiation detector according to claim 1, wherein said multi-material cantilever is a bi-material cantilever.

4. The radiation detector according to claim 1, wherein at least a surface of said multi-material cantilever is adapted for absorbing an incident radiation (RAD) or particle flux to be detected and undergoing a temperature increase as a consequence of said absorption.

5. The radiation detector according to claim 3, wherein said input coupling means are chosen from:
    a dielectric prism in Kretschmann-Raether configuration, having a conducting layer of said multilayer structure deposed thereon;
    a dielectric volume grating, having a conducting layer of said multilayer structure deposed thereon; or
    a conducting relief grating deposed on a substrate, said conducting relief grating constituting a conducting layer of said multilayer structure of the energy absorber.

6. The radiation detector according to claim 5, wherein at least a surface of said multi-material cantilever is adapted for absorbing an incident radiation (RAD) or particle flux to be detected and undergoing a temperature increase as a consequence of said absorption; wherein said gap is disposed between said multi-material cantilever and said conducting layer deposed on said dielectric prism, volume grating or substrate.

7. The radiation detector according to claim 1, wherein said multilayer structure comprises a layer whose dielectric permittivity changes upon a temperature variation of at least a part of said energy absorber.

8. The radiation detector according to claim 7, wherein said layer whose dielectric permittivity changes is a conducting layer supporting surface plasmons.

9. The radiation detector according to claim 8, wherein said conducting layer whose dielectric permittivity changes is adapted for absorbing an incident radiation (RAD) to be detected and experience a temperature increase as a consequence of said absorption, and is separated from said input coupling means by said dielectric layer.

10. The radiation detector according to claim 8, wherein said input coupling means include a dielectric prism in Otto configuration, a dielectric layer being disposed between said dielectric prism and said conducting layer with changing dielectric permittivity.

11. The radiation detector according to claim 1, wherein said multilayer structure comprises a layer whose dielectric permittivity changes upon a temperature variation of at least a part of said energy absorber; wherein said layer whose dielectric permittivity changes upon a temperature variation is part of said multi-material cantilever.

12. The radiation detector comprising a bi-dimensional array of thermal radiation detectors according to claim 1.

13. The radiation detector or imaging radiation detector according to claim 1, further comprising an optical radiation source for generating a polarized light beam having at least a component with TM-polarization with respect to a coupling surface of said energy absorber and directing it to said input coupling means for coupling to said energy absorber;
    wherein the radiation detector comprises a bi-dimensional array of thermal radiation detectors; said light beam is a collimated beam and said optical radiation source is adapted to simultaneously direct it to all thermal radiation detectors of said bi-dimensional array.

14. The thermal detector or imaging radiation detector according to claim 13, wherein said optical radiation source is a visible or near infrared radiation source.

15. The thermal detector or imaging radiation detector according to claim 13, wherein said optical radiation source is a laser.

16. The radiation or imaging radiation detector according to claim 1, further comprising an optical detector or array of optical detectors for detecting a reflected part of a light beam coupled to said energy absorber by said input coupling means.

17. The radiation detector or imaging radiation detector according to claim 16, wherein said optical detector or array of optical detectors is chosen from: a photodiode, a bi-dimensional array of photodiodes, a photomultiplier, a bi-dimensional array of photomultipliers, a charge-coupled device, a bi-dimensional array of charge-coupled devices or a photosensitive sheet.

18. The radiation detector or imaging radiation detector according to claim 16, further comprising output coupling means for optically coupling said reflected beam to said optical detector or array of optical detectors.

19. The radiation detector or imaging radiation detector according to claim 18, wherein said output coupling means comprise a surface of a dielectric prism, a different surface of which constitutes or belongs to said input coupling means.

20. The radiation detector according to claim 18, wherein a single grating belongs to both said input and output coupling means.

21. The radiation detector or imaging radiation detector according to claim 1, further comprising interferometric means for converting a change in the phase of a reflected part of a light beam coupled to said energy absorber by said input coupling means, induced by a temperature increase of said energy absorber, to a change in its intensity.

22. An imaging radiation detector according to claim 1, the radiation detector comprising a bi-dimensional array of thermal radiation detectors; further comprising spatial filtering means for processing a radiation image carried by a reflected part of a light beam coupled to said energy absorber by said input coupling means.

23. The radiation detector or imaging thermal detector according to claim 1, wherein said energy absorber is adapted for absorbing infrared electromagnetic radiation.

* * * * *